US012335298B2

(12) United States Patent
McParland et al.

(10) Patent No.: US 12,335,298 B2
(45) Date of Patent: *Jun. 17, 2025

(54) PREDICTING CYBER RISK FOR ASSETS WITH LIMITED SCAN INFORMATION USING MACHINE LEARNING

(71) Applicant: Tenable, Inc., Columbia, MD (US)

(72) Inventors: Damien McParland, Louth (IE); Bryan Doyle, Kilmacanogue (IE); Vincent Gilcreest, Leopardstown (IE); Renaud Deraison, New York, NY (US)

(73) Assignee: Tenable, Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,571

(22) Filed: Oct. 2, 2023

(65) Prior Publication Data

US 2024/0031396 A1 Jan. 25, 2024

Related U.S. Application Data

(63) Continuation of application No. 17/181,249, filed on Feb. 22, 2021, now Pat. No. 11,818,160.

(51) Int. Cl.
*H04L 9/40* (2022.01)
*G06N 5/04* (2023.01)
*G06N 20/00* (2019.01)

(52) U.S. Cl.
CPC .......... *H04L 63/1433* (2013.01); *G06N 5/04* (2013.01); *G06N 20/00* (2019.01)

(58) Field of Classification Search
None
See application file for complete search history.

(56) References Cited

U.S. PATENT DOCUMENTS

2011/0185431 A1* 7/2011 Deraison ............... G06F 21/577
726/25
2021/0211451 A1* 7/2021 Alsharif ................. H04L 63/12

* cited by examiner

*Primary Examiner* — Cai Y Chen
(74) *Attorney, Agent, or Firm* — Muncy, Geissler, Olds & Lowe, P.C.; Daniel Podhajny

(57) ABSTRACT

Techniques, methods and/or apparatuses are disclosed that enable prediction of cyber risks of assets of networks. Through the disclosed techniques, a cyber risk prediction model, which may be a form of a machine learning model, may be trained to predict cyber risks. The cyber risk model may be provided to a cyber risk predictor two predict cyber risks of an asset, without the need to scan the asset at a very deep scan level.

32 Claims, 7 Drawing Sheets

PREDICTING CYBER RISK FOR ASSETS WITH LIMITED SCAN INFORMATION USING MACHINE LEARNING

CROSS-REFERENCE TO RELATED APPLICATIONS

The present application for patent is a Continuation of U.S. Non-Provisional application Ser. No. 17/181,249, entitled "PREDICTING CYBER RISK FOR ASSETS WITH LIMITED SCAN INFORMATION USING MACHINE LEARNING," filed Feb. 22, 2021, assigned to the assignee hereof, and expressly incorporated herein by reference in its entirety.

TECHNICAL FIELD

Various aspects and embodiments described herein generally relate to risk identification, and more particularly to predicting cyber risk for assets with limited information using machine learning.

BACKGROUND

Security scanning of an asset in a network typically requires local checks to rigorously scan the asset. In certain circumstances, network operators or administrators cannot or will not scan a portion of their assets using credentials or may only scan with a limited set of security scanning elements or plugins. In these circumstances, there is limited information (low scan depth) on which to base a cyber risk score.

Cyber risk scores are usually based on the vulnerabilities that are found to be open on an asset coupled with some measure of that asset's criticality to the organization. In the case of an asset that has been scanned without authentication or without a full suite of security plugins, the list of vulnerabilities found on the asset is almost certainly incomplete. It is difficult to determine thy cyber risk score of an asset with incomplete information.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

An embodiment may be directed to a method for training a cyber risk predictor. The method may be performed by a cyber risk prediction trainer. The method may comprise obtaining a training dataset comprising one or more scan-to-risk maps corresponding to one or more training assets. The method may also comprise training a cyber risk prediction model based on the training dataset. The method may further comprise providing the trained cyber risk prediction model to a cyber risk predictor. Each scan-to-risk map of the training dataset may comprise a low scan metadata and a cyber risk score mapped to the low scan metadata. The low scan metadata may be associated with results of scanning the corresponding training asset at a low scan depth less than a deep-scan-depth-threshold. The cyber risk score may be associated with results of scanning the corresponding training asset at a full scan depth equal to or greater than the deep-scan-depth-threshold. The cyber risk prediction model may enable the cyber risk predictor to predict a cyber risk score of a target asset of a network based on results of scanning the target asset at a target scan depth less than the deep-scan-depth-threshold.

An embodiment may be directed to a method to predict a cyber risk of a target asset of a network. The method may be performed by a cyber risk predictor. The method may comprise scanning the target asset at a target scan depth less than a deep-scan-depth-threshold. The method may also comprise predicting, by a cyber risk predictor, a cyber risk score of the target asset based on the scanning. The cyber risk predictor may comprise a cyber risk prediction model trained on a training dataset to predict cyber risks of assets. The training dataset may comprise one or more scan-to-risk maps corresponding to one or more training assets. Each scan-to-risk map of the training dataset may comprise a low scan metadata and a cyber risk score mapped to the low scan metadata. The low scan metadata may be associated with results of scanning the corresponding training asset at a low scan depth less than a deep-scan-depth-threshold. The cyber risk score may be associated with results of scanning the corresponding training asset at a full scan depth equal to or greater than the deep-scan-depth-threshold.

An embodiment may be directed to cyber risk prediction trainer. The cyber risk prediction trainer may comprise a memory and at least one processor coupled to the memory. The memory and the at least one processor may be configured to obtain a training dataset comprising one or more scan-to-risk maps corresponding to one or more training assets. The memory and the at least one processor may also be configured to train a cyber risk prediction model based on the training dataset. The memory and the at least one processor may further be configured to provide the trained cyber risk prediction model to a cyber risk predictor. Each scan-to-risk map of the training dataset may comprise a low scan metadata and a cyber risk score mapped to the low scan metadata. The low scan metadata may be associated with results of scanning the corresponding training asset at a low scan depth less than a deep-scan-depth-threshold. The cyber risk score may be associated with results of scanning the corresponding training asset at a full scan depth equal to or greater than the deep-scan-depth-threshold. The cyber risk prediction model may enable the cyber risk predictor to predict a cyber risk score of a target asset of a network based on results of scanning the target asset at a target scan depth less than the deep-scan-depth-threshold.

An embodiment may be directed to cyber risk predictor. The cyber risk predictor may comprise a memory and at least one processor coupled to the memory. The memory and the at least one processor may be configured to scan the target asset at a target scan depth less than a deep-scan-depth-threshold. The memory and the at least one processor may also be configured to predict a cyber risk score of the target asset based on the scanning. The cyber risk predictor may comprise a cyber risk prediction model trained on a training dataset to predict cyber risks of assets. The training dataset may comprise one or more scan-to-risk maps corresponding to one or more training assets. Each scan-to-risk map of the training dataset may comprise a low scan metadata and a cyber risk score mapped to the low scan metadata. The low scan metadata may be associated with results of scanning the corresponding training asset at a low scan depth less than a deep-scan-depth-threshold. The cyber risk score may be associated with results of scanning the corresponding training asset at a full scan depth equal to or greater than the deep-scan-depth-threshold.

An embodiment may be directed to cyber risk prediction trainer. The cyber risk prediction trainer may comprise means for obtaining a training dataset comprising one or more scan-to-risk maps corresponding to one or more training assets. The cyber risk prediction trainer may also comprise means for training a cyber risk prediction model based on the training dataset. The cyber risk prediction trainer may further comprise means for providing the trained cyber risk prediction model to a cyber risk predictor. Each scan-to-risk map of the training dataset may comprise a low scan metadata and a cyber risk score mapped to the low scan metadata. The low scan metadata may be associated with results of scanning the corresponding training asset at a low scan depth less than a deep-scan-depth-threshold. The cyber risk score may be associated with results of scanning the corresponding training asset at a full scan depth equal to or greater than the deep-scan-depth-threshold. The cyber risk prediction model may enable the cyber risk predictor to predict a cyber risk score of a target asset of a network based on results of scanning the target asset at a target scan depth less than the deep-scan-depth-threshold.

An embodiment may be directed to cyber risk predictor. The cyber risk predictor may comprise means for scanning the target asset at a target scan depth less than a deep-scan-depth-threshold. The cyber risk predictor may also comprise means for predicting a cyber risk score of the target asset based on the scanning. The cyber risk predictor may comprise a cyber risk prediction model trained on a training dataset to predict cyber risks of assets. The training dataset may comprise one or more scan-to-risk maps corresponding to one or more training assets. Each scan-to-risk map of the training dataset may comprise a low scan metadata and a cyber risk score mapped to the low scan metadata. The low scan metadata may be associated with results of scanning the corresponding training asset at a low scan depth less than a deep-scan-depth-threshold. The cyber risk score may be associated with results of scanning the corresponding training asset at a full scan depth equal to or greater than the deep-scan-depth-threshold.

An embodiment may be directed to a non-transitory computer-readable medium storing computer-executable instructions for cyber risk prediction trainer. The computer-executable instructions may comprise one or more instructions causing the cyber risk prediction trainer to obtain a training dataset comprising one or more scan-to-risk maps corresponding to one or more training assets. The computer-executable instructions may also comprise one or more instructions causing the cyber risk prediction trainer to train a cyber risk prediction model based on the training dataset. The computer-executable instructions may further comprise one or more instructions causing the cyber risk prediction trainer to provide the trained cyber risk prediction model to a cyber risk predictor. Each scan-to-risk map of the training dataset may comprise a low scan metadata and a cyber risk score mapped to the low scan metadata. The low scan metadata may be associated with results of scanning the corresponding training asset at a low scan depth less than a deep-scan-depth-threshold. The cyber risk score may be associated with results of scanning the corresponding training asset at a full scan depth equal to or greater than the deep-scan-depth-threshold. The cyber risk prediction model may enable the cyber risk predictor to predict a cyber risk score of a target asset of a network based on results of scanning the target asset at a target scan depth less than the deep-scan-depth-threshold.

An embodiment may be directed to a non-transitory computer-readable medium storing computer-executable instructions for cyber risk predictor. The computer-executable instructions may comprise one or more instructions causing the cyber risk predictor to scan the target asset at a target scan depth less than a deep-scan-depth-threshold. The computer-executable instructions may also comprise one or more instructions causing the cyber risk predictor to predict a cyber risk score of the target asset based on the scanning. The cyber risk predictor may comprise a cyber risk prediction model trained on a training dataset to predict cyber risks of assets. The training dataset may comprise one or more scan-to-risk maps corresponding to one or more training assets. Each scan-to-risk map of the training dataset may comprise a low scan metadata and a cyber risk score mapped to the low scan metadata. The low scan metadata may be associated with results of scanning the corresponding training asset at a low scan depth less than a deep-scan-depth-threshold. The cyber risk score may be associated with results of scanning the corresponding training asset at a full scan depth equal to or greater than the deep-scan-depth-threshold.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
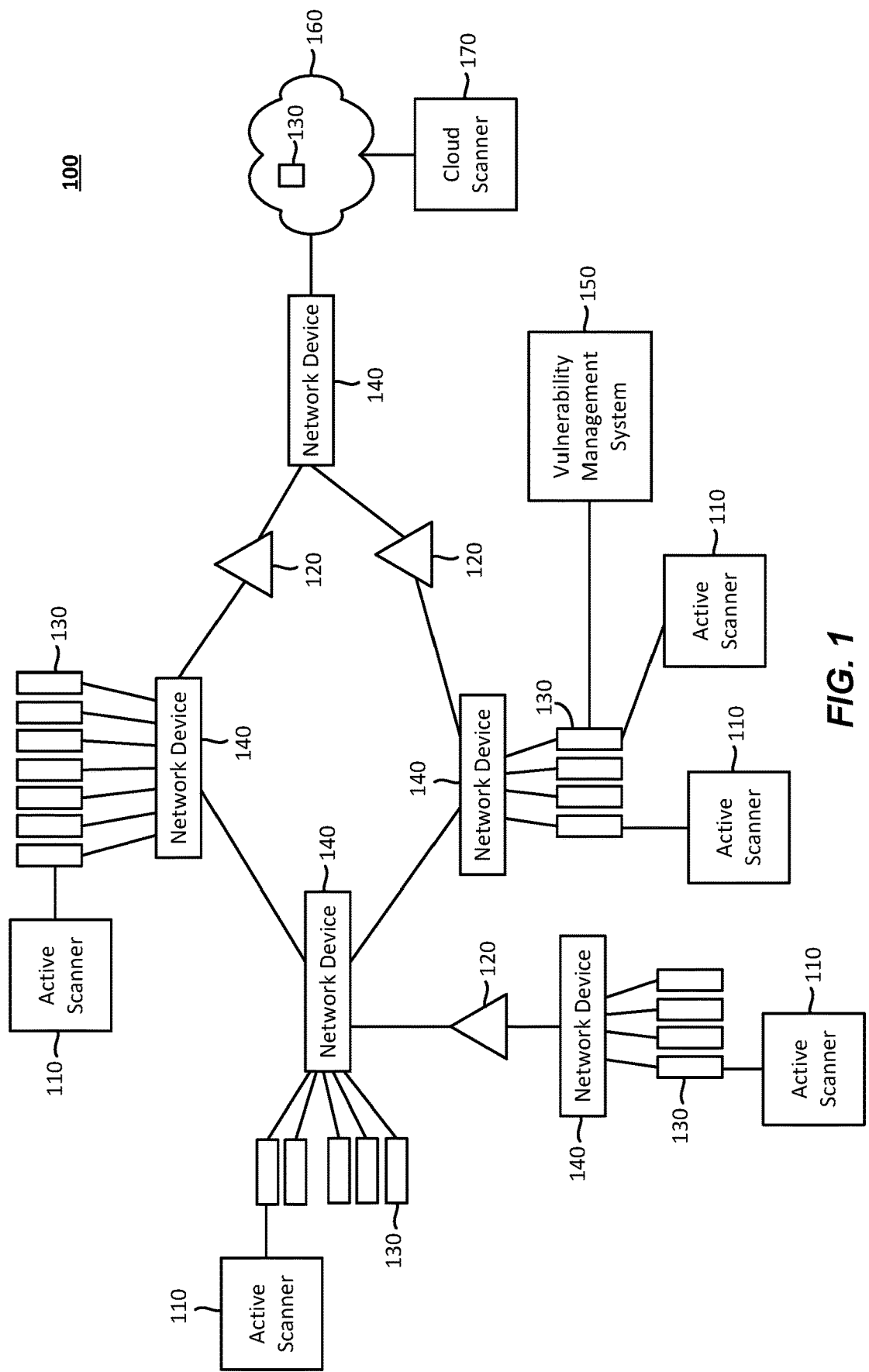
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), transport layer security (TLS) certificate, etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, industrial control system, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof.

Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

FIG. 1 illustrates an exemplary network 100 having various assets 130 that are interconnected via one or more network devices 140 and managed using a vulnerability management system 150. More particularly, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

The assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations.

Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assets like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100. The network 100 may include one or more active scanners 110 configured to communicate packets or other messages within the network 100 to detect new or changed information describing the various network devices 140 and other assets 130 in the network 100. For example, in an implementation, the active scanners 110 may perform credentialed or uncredentialed audits to scan certain assets 130 in the network 100 and obtain information that may then be analyzed to identify potential vulnerabilities in the network 100. More particularly, in an implementation, the credentialed audits may include the active scanners 110 using suitable authentication technologies to log into and obtain local access to the assets 130 in the network 100 and perform any suitable operation that a local user could perform thereon without necessarily requiring a local agent.

Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.).

On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In an implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic.

The reconstructed sessions may then be used in combination with the information obtained with the active scanners 110 to build a model or topology describing the network 100. For example, in an implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In an implementation, the passive scanners 120 may further apply various signatures to the information in the observed traffic to identify vulnerabilities in the network 100 and determine whether any data in the observed traffic potentially targets such vulnerabilities. In an implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In an implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications).

Furthermore, in an implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In an implementation, the passive scanners 120 may observe as many sessions in the network 100 as possible to provide optimal visibility into the network 100 and the activity that occurs therein. For example, in an implementation, the passive scanners 120 may be deployed at any suitable location that enables the passive scanners 120 to observe traffic going into and/or out of one or more of the network devices 140. In an implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in an implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
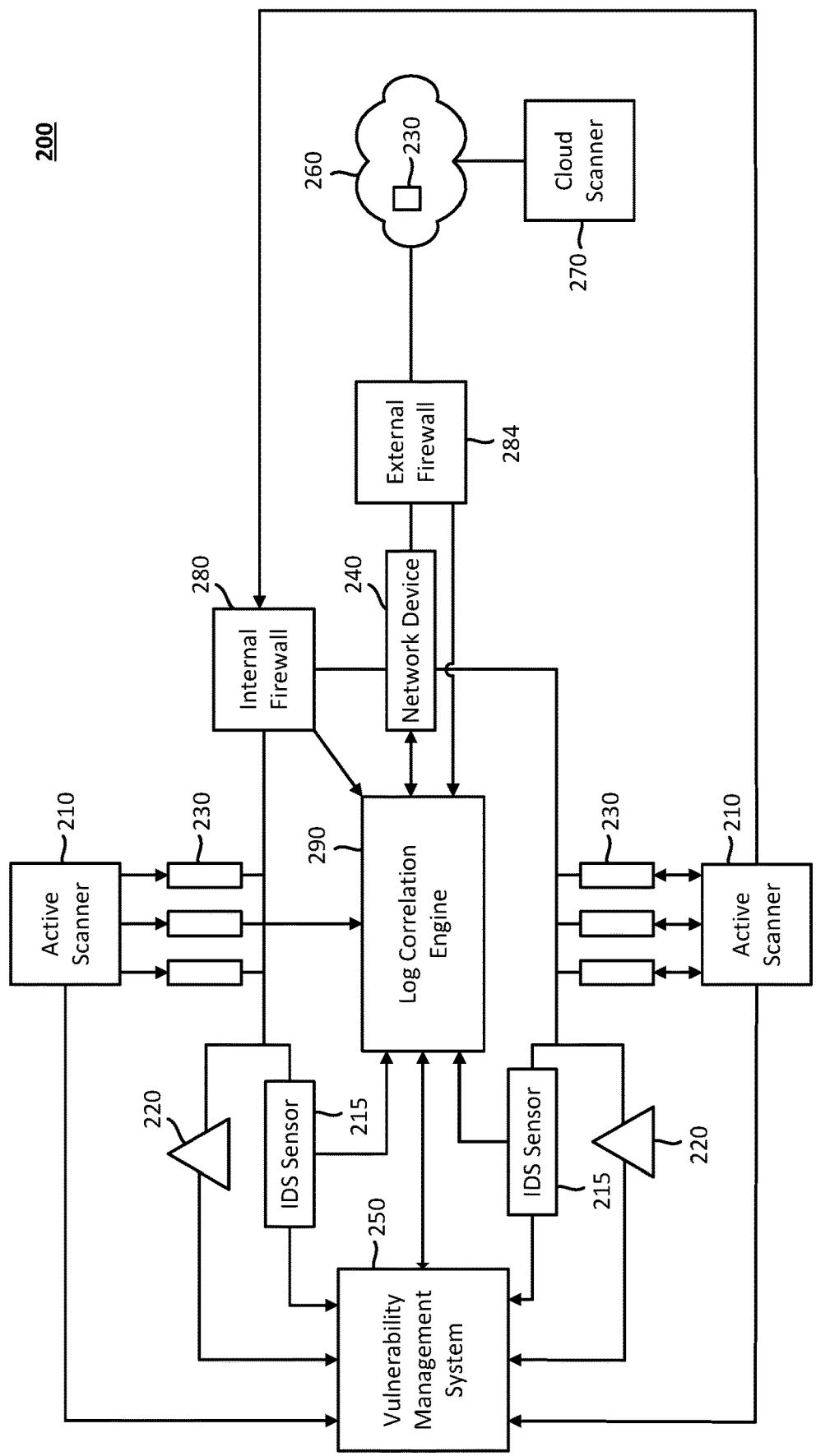
FIG. 2 illustrates another exemplary network having various assets that can be managed using a vulnerability management system, according to various aspects.

FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in an implementation, the network 200 may include one or more active scanners 210 and/or cloud scanners 270, which may interrogate assets 230 in the network 200 to build a model or topology of the network 200 and identify various vulnerabilities in the network 200. The network 200 may also include one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in an implementation, a log correlation engine 290 may be arranged to receive logs containing events from various sources distributed across the network 200. For example, in an implementation, the logs received at the log correlation engine 290 may be generated by internal firewalls 280, external firewalls 284, network devices 240, assets 230, operating systems, applications, or any other suitable resource in the network 200. Accordingly, in an implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In an implementation, the active scanners 210 may be strategically distributed in locations across the network 200 to reduce stress on the network 200. For example, the active scanners 210 may be distributed at different locations in the network 200 to scan certain portions of the network 200 in parallel, whereby an amount of time to perform the active scans may be reduced. Furthermore, in an implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260. The term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in an implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may be configured to scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in an implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In an implementation, in response to obtaining the snapshot of the network 200, the active scanners 210 and/or cloud scanners 270 may then report the information describing the snapshot to the vulnerability management system 250, which may use the information to remediate and otherwise manage the vulnerabilities and assets in the network.

Furthermore, in an implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in an implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in an implementation, the passive scanners 220 may be deployed directly within or adjacent to an intrusion detection system (IDS) sensor 215, which may provide the passive scanners 220 with visibility relating to intrusion events or other security exceptions that the IDS sensor 215 identifies. In an implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In an implementation, the information that the passive scanners 220 obtains from sniffing the traffic traveling across, originating from, or directed to the network 200 may therefore provide a real-time record describing the activity that occurs in the network 200. Accordingly, in an implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In an implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In an implementation, the log correlation engine 290 may normalize the events contained in the various logs received from the sources distributed across the network 200, and in an implementation, may further aggregate the normalized events with information describing the snapshot of the network 200 obtained by the active scanners 210 and/or the network traffic observed by the passive scanners 220. Accordingly, in an implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in an implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or activities observed by the passive scanners 220 to comprehensively monitor, remediate, and otherwise manage the vulnerabilities and assets in the network 200. Additionally, in an implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and/or the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution, or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset may be a set of rules that govern when a solution is to be removed or merged with another and how that merge is to be accomplished. In an example, when solution texts not matching a given ruleset are discovered, they may be flagged for manual review. Examples of rules that may be included in one or more rulesets are as follows:

- If there is more than one matching solution in the solution list, remove all but one of those solutions.
- For solutions matching "Upgrade to <product> x·y·z" where x, y, and z are integers, select a single result with the highest x·y·z value (comparing against x first, then y, then z).
- For solutions matching "Apply fix <fix> to <product>", create a new combined solution where <fix> for each solution is concatenated into a comma separated list for a given <product>.

In accordance with a second embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

A "plugin" may include logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft:windows_vista: 6.0:sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.

In accordance with one implementation of the second embodiment, solutions (or solution 'texts') may first together based on the CPEs in the plugins they were reported in. The solutions may then be sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations, additional ruleset-based filtering from the first embodiment can also be applied, to filter out (or de-duplicate) additional duplicate solution information.

In accordance with a third embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

It is indicated above that security scanning of an asset in a network typically require local checks to rigorously scan the asset. In certain circumstances, network operators or administrators cannot or will not scan a portion of their assets using credentials or may only scan with a limited set of scanning elements or plugins. In these circumstances, there is limited information (low scan depth) on which to base a cyber risk score.

Cyber risk scores are usually based on the vulnerabilities that are found to be open on an asset coupled with some measure of that asset's criticality to the organization. In the case of an asset that has been scanned without authentication or without a full suite of security plugins, the list of vulnerabilities found on the asset is almost certainly incomplete. It is difficult to determine the cyber risk score of an asset with incomplete information.

To address some or all disadvantages of conventional approaches toward determining cyber risk scores of assets, it is proposed use a machine learning model to predict cyber risk scores of network assets based on limited scanning (low scan depth). The machine learning model may be trained on both behavioral attributes of a network (such as scan frequency or authentication habits) together with asset attributes (such as the operating system or the ports found to be open) to predict the exposure score for assets where limited information is available.

A machine learning model may be leveraged to find assets that are similar to the asset for which the exposure score (e.g, cyber risk score) is to be predicted, but where there is much richer information. The model may be trained on scan information and target network's behavioral attributes. The known exposure scores of these assets that have been scanned deeply to estimate the score of a target asset that has been scanned at a low scan depth.

While scans with low scan depth do not provide the rich information needed to precisely calculate the exposure score for an asset, they can often provide some information that can be used to infer the exposure score. Such information may be collected over a rolling window period of time, e.g., 90 days. Information from the most recent low depth scan (e.g., uncredentialed/unauthenticated scan) may be retained for each asset. Table 1 shows examples of such asset level features:

TABLE 1

Asset Features

| | |
|---|---|
| Operating System | Port numbers found to be open |
| Device Type | CPEs detected |
| Open CVEs detected | Remediation maturity |
| Count of open TCP ports detected | Remediation effectiveness |
| Count of open UDP ports detected | Scan frequency score |

In addition to the asset features, features that describe a customer's behavior across some or all assets in a network may also be gathered. Such information may be gathered, maintained and/or updated Examples of such customer/network features are shown in Table 2.

TABLE 2

Network Features

| | |
|---|---|
| Median VPR component score across assets scanned with sufficient depth | Scan depth score |
| Scan frequency score | Assessment Maturity score |
| Proportion of assets authenticated | Use of automated patch management |

It should be noted that Tables 1 and 2 are intended to be illustrative and are not necessarily exhaustive.

A training dataset may be compiled by collecting all of this information from low depth scans on assets for which accurate exposure scores—cyber risk scores—is available or otherwise attainable. For example, much deeper scans, referred to as "full" scans, may be performed on the same assets. Full scans may include credentialed scans, which enables highly accurate data to be obtained. Thus, cyber risk scores obtained from such full scans may deemed to accurately reflect the vulnerabilities of the scanned asset.

Some features may be cleaned and standardized to reduce cardinality (e.g., the operating system strings). For ease of reference, assets of the training dataset may also be referred to as "training" asset.

This training set may then be used to train a machine learning model to predict the cyber risk scores for assets scanned at low scan depths. For example, a random forest machine learning model may be used. Multiple machine learning models (e.g., multiple random forest models) with various tuning parameter values may be fitted to the data, and the best fitting model may be chosen, e.g., using cross validation. The trained machine learning model may then be used to predict the exposure score (e.g., cyber risk score) for target assets with low scan depth.

One advantage (of which there may be several) of the proposed cyber risk prediction model is that a cyber risk score of an asset may be predicted even when there is limited scan information available. For example, the cyber risk score may be predicted even when there is little to no local access to the asset.

Figure 3:
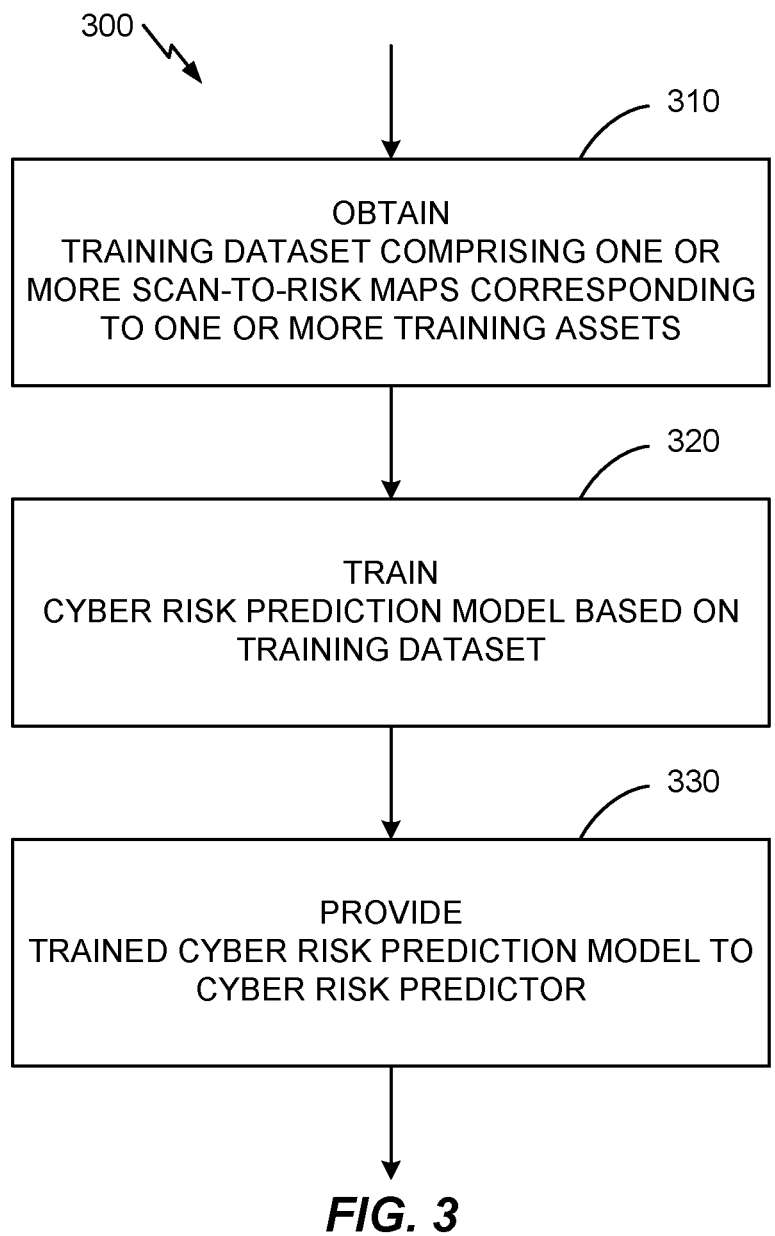
FIGS. 3 and 4 illustrate flow charts of an example method for training a cyber risk predictor, according to various aspects.

FIG. 3 illustrates a flow chart of an example method 300 for training a cyber risk predictor. The method 300 may be performed by a cyber risk prediction trainer. In an aspect, the vulnerability management system 150, 250 may also perform cyber risk prediction trainer functions. In block 310, the cyber risk prediction trainer may obtain a training dataset associated with assets—training assets—whose "true" or otherwise accurate cyber risk scores have been determined.

The training dataset may comprise one or more scan-to-risk maps corresponding to the one or more training assets associated with the training dataset. Each scan-to-risk map of the training dataset may comprise a low scan metadata and a cyber risk score mapped to that low scan metadata. Each low scan metadata may be associated with results of scanning the corresponding training asset at a low scan depth. In an aspect, the low scan depth may be viewed as a scan depth less than a deep-scan-depth-threshold. Also, each cyber risk score may be associated with results of scanning the corresponding training asset at a full scan depth. In an aspect, the full scan depth may be viewed as a scan depth greater than or equal to the deep-scan-depth-threshold. The scan depths will be explained in further detail below.

The following is to be noted. It is not necessary that the full scan depth be the same for all of the training assets. In other words, between first and second training assets of the training dataset, the full scan depth of the first training asset may be different from the full scan depth the second training asset. For example, the first training asset may be a Microsoft Windows™ desktop running Web-based applications, while the second training asset may be a UNIX™ server providing database services. Thus, some security issues, which may be checked in scanning, may be relevant for the first training asset and not for the second training asset, while other security issues may be relevant for the second training asset and not for the first training asset.

Similarly, it is not necessary that the low scan depth be the same for all of the training assets. That is, between first and second training assets of the training dataset, the low scan depth of the first training asset may be different from the low scan depth the second training asset. Again, this can be due to differences in configurations of the first and second training assets.

In an aspect, two scan-to-risk maps may correspond with a same training asset. That is, the one or more scan-to-risk maps may comprise first and second scan-to-risk maps both corresponding to a same training asset. The first scan-to-risk map may comprise a first low scan metadata and a first cyber risk score, and the second scan-to-risk map may comprise a second low scan metadata and a second cyber risk score. The first and second low scan metadata may be different, while the first and second cyber risk being the same.

The first and second cyber risk scores being the same is logical since the cyber risk score reflects the true exposure score of the corresponding training asset. However, the first and second low scan metadata may be different do two different scans done at the low depth scan level. More generally, this can allow different types low scans to be performed to predict a cyber risk score of one asset.

Figure 4:
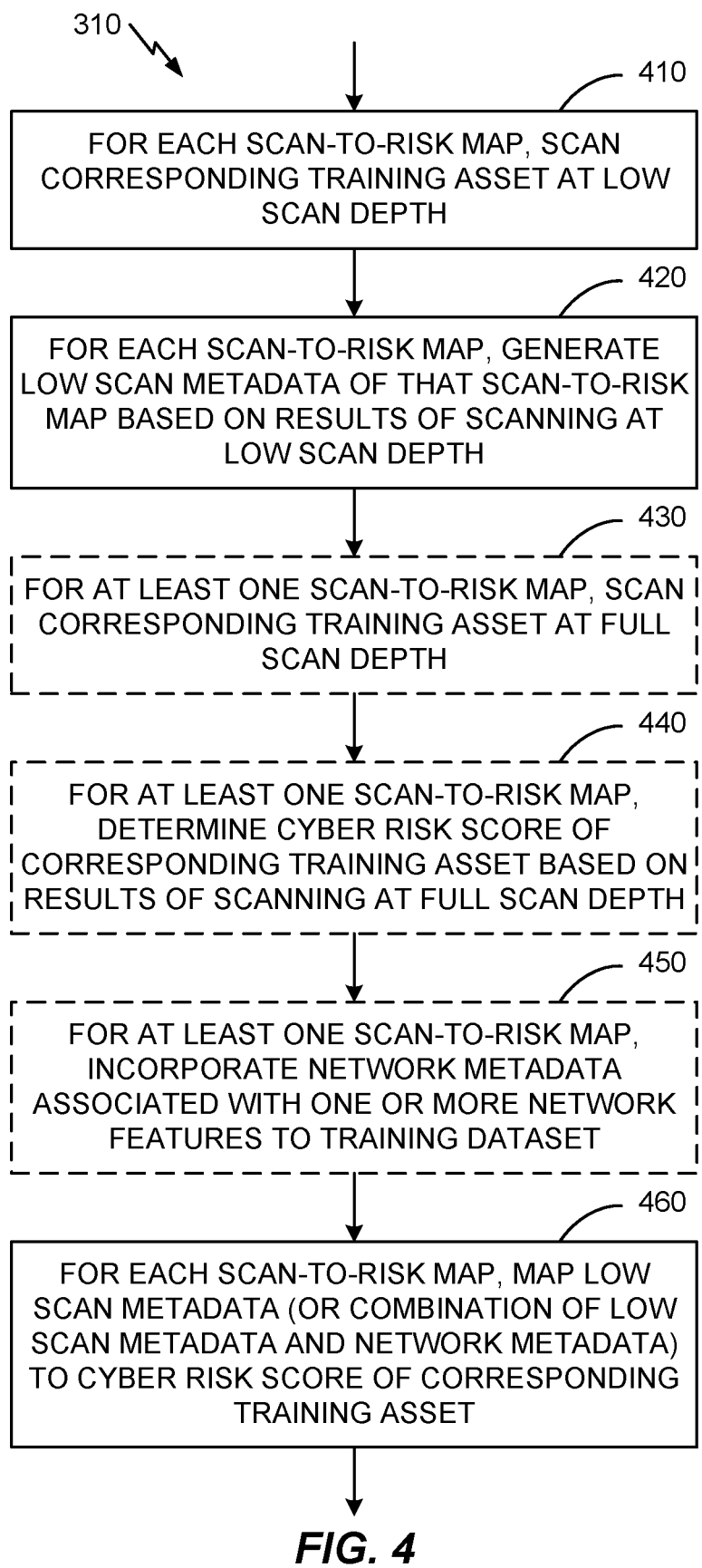

FIG. 4 illustrates a flow chart of an exemplary process that may be performed, e.g., by the cyber risk prediction trainer, to implement block 310. In block 410, for each of the one or more scan-to-risk maps, the cyber risk prediction trainer may scan the training asset corresponding to that scan-to-risk map at the low scan depth. Since the low scan depth need not be same for all of the one or more training assets, the low scan depth also need not be same for all of the one-or-more scan-to-risk maps. That is, between first and second scan-to-risk maps, the low scan depth of the first scan-to-risk map may be different from the low scan depth of the second scan-to-risk map.

In an aspect, scanning at the low scan depth may comprise no credentialed scanning, i.e., may comprise uncredentialed scanning only. That is, the cyber risk prediction trainer may scan the corresponding training asset without local access when scanning at the low scan depth. In another aspect, scanning at the low scan depth may comprise some credentialed scanning of the corresponding training asset, in addition to or instead of the uncredentialed scanning.

In block 420, for each of the one or more scan-to-risk maps, the cyber risk prediction trainer may generate the low scan metadata of that scan-to-risk map based on results of the scanning at the low scan depth. In an aspect, scanning the corresponding training asset at the low scan depth in block 410 may result in the cyber risk prediction trainer acquiring or otherwise being provided with asset features—referred to as "low scan asset features" for ease of reference. In block 420, the low scan metadata of that scan-to-risk map may be generated based on the low scan asset features.

The low scan asset features may comprise any combination of the asset features listed in Table 1. That is, the low scan asset features may comprise any one or more of an operating system, a device type, open common vulnerabilities and exposures (CVEs), open transport control protocol (TCP) ports, open user datagram protocol (UDP) ports, open port numbers, common platform enumeration (CPE), remediation maturity, remediation effectiveness, and scan frequency. Remediation maturity and remediation effectiveness may be viewed as metrics intended to measure how "good" a network operation is at fixing vulnerabilities. For example, they may refer to the speed at which the vulnerabilities are remediated and to the completeness of the remediation. Scan frequency score at an asset level may be viewed as a measure of how often a given asset was scanned in some previous window of time, e.g., 90 days. Scan frequency score at a network level may be viewed as indicating a statistical description (e.g, mean, median, mode, etc.) of asset level scan frequency scores of the network.

In an aspect, the cyber risk scores of the scan-to-risk maps may be determined separately from determining the low scan metadata. For example, full scans may be performed on the training assets. The full scan results may then be made available in obtaining the training dataset.

But in another aspect, the low scan metadata and the cyber risk score of some or all scan-to-risk maps may be determined contemporaneously with the low scan metadata. That is, in block 430, for at least one of the one or more scan-to-risk maps, the cyber risk prediction trainer may scan the corresponding training asset at the full scan depth. In an aspect, scanning at the full scan depth may comprise credentialed scanning. That is, the cyber risk prediction trainer may scan local access to the corresponding training asset when scanning at the full scan depth. The scanning at the full scan depth may also comprise uncredentialed scanning of the corresponding training asset, in addition to the credentialed scanning.

In block 440, for any training asset that has been scanned at the full scan depth, the cyber risk prediction trainer may determine the cyber risk score of the corresponding training asset based on results of the scanning at the full scan depth. Blocks 430, 440 may be optional, and thus are shown as dashed boxes.

Recall from above that network features may also taken into account in predicting the cyber risk score. For example, if a network operator regularly and frequently runs scans on the network's assets and takes remedial actions to secure the network, then it can be reasonable to expect that individual assets of the network will also be less vulnerable. That is, characteristics of the network in the aggregate may be considered when predicting cyber risk scores of individual assets when less than full information of the assets is available.

Thus, in block 450, for at least one of the one or more scan-to-risk maps, the cyber risk prediction trainer may incorporate a network metadata associated with one or more network features. The network features may comprise any combination of the network features listed in Table 2. That is, the network features may comprise any one or more of any one or more of an aggregate vulnerability priority rating (VPR), scan frequency score, a proportion of authenticated assets, a scan depth score, assessment maturity, and automated patch management. Block 450 may also be optional. Brief explanation of the network features is provided as follows:

Aggregate VPR: This is also referred to as the median VPR component score in Table 2. The VPR component score of an asset is the portion of the asset cyber risk score that is derived from the vulnerabilities found on the asset. The aggregate VPR score may be viewed as statistical description (e.g., mean, median, mode, etc.) of VPR component scores as derived from the network's other assets that have been subjected to full scans.

Scan frequency score: May be viewed as statistical description (e.g., mean, median, mode, etc.) of asset level scan frequency scores (defined above) across a network.

Proportion of asset authenticated: May be viewed a proportion of assets on the network that have been scanned with authentication.

Scan depth score: May be viewed as statistical description (e.g., mean, median, mode, etc.) of asset level scan depth scores across assets of the network.

Assessment Maturity: Asset level assessment maturity score may be viewed as a weighted average of the asset's scan frequency score and scan depth score. Network level assessment maturity score may be viewed as a statistical description (e.g., mean, median, mode, etc.) of asset level assessment maturity scores across assets of the network.

Automated patch management: May be viewed as statistical description (e.g., mean, median, mode, etc.) of asset level remediation maturity and effectiveness defined above.

In block 460, for each of the one or more scan-to-risk maps, the cyber risk prediction trainer may map the low scan metadata to the cyber risk score of the corresponding training asset. If the network metadata has been incorporated (i.e., if block 450 has been performed), then the cyber risk prediction trainer may map a combination of the low scan metadata and the network metadata to the cyber risk score of the corresponding training asset.

Referring back to FIG. 3, in block 320, the cyber risk prediction trainer may train the cyber risk prediction model based on the training dataset.

In block 330, the trained cyber risk prediction model may be provided to a cyber risk predictor. The trained cyber risk prediction model may enable the cyber risk predictor to predict a cyber risk score of a target asset of a network based on results of scanning the target asset at a target scan depth less than the deep-scan-depth-threshold.

Depth of scanning may be determined is various ways. Recall from above that security auditing applications typically display security issues—e.g., vulnerabilities, security misconfigurations, weaknesses, etc.—paired with a particular solution for that given issue. Then a scan depth of a scan may be based on security issues checked by the scan. For example, given an asset, there may be a number of security issues identified or otherwise known to be related to the given asset that can be checked. In a scan of the asset, a check may be made some or all of the known/identified security issues related to the asset. In other words, when an asset is scanned, a set of security issues—referred to as "security issues set" for convenience—may be checked. In an aspect, security issues may include security issues identifiable through CVE identifiers.

In an aspect, the scan depth may be quantified as a number of known security issues checked by the scan. In this instance, the deep-scan-depth-threshold may be set as some threshold number of security issues. Then the low scan depth may be related to relatively small security issues set (e.g., number of security issues checked by the scan being less than the deep-scan-depth-threshold), while a full scan may be related to a relatively large security issues set (e.g., number of security issues checked by the scan being equal to or greater than the deep-scan-depth-threshold).

Alternatively or in addition thereto, the scan depth may be quantified to reflect a number security issues checked by the scan relative to a number of known security issues. For example, the scan depth of a scan may range between 0 (e.g., none of the known security issues being checked) and 1 (e.g., all of the known issues being checked). In this instance, the deep-scan-depth-threshold may be set as some threshold ratio (a number between 0 and 1). Then the low scan depth may be related to relatively small ratio (e.g., number of security issues checked by the scan relative to the number of known security issues being less than the deep-scan-depth-threshold), while a full scan may be related to a relatively large ratio (e.g., number of security issues checked by the scan relative to the number of known security issues being equal to or greater than the deep-scan-depth-threshold).

In an aspect, the number of known security issues may differ for different training assets. As an illustration, some security issues may be relevant to a desktop running Microsoft Windows™ OS but not to a server running UNIX™ OS and vice versa. This implies that the deep-scan-depth-threshold may also differ for different training assets. Moreover, for at least one training asset, the number of known security issues may change over time as more vulnerabilities of the training asset are discovered. This implies that the deep-scan-depth-threshold of the training asset may also change over time. Alternatively, the deep-scan-depth-threshold may be changed irrespective of whether additional security issues are discovered for a training asset. For example, if greater confidence in the cyber risk score is desired, the deep-scan-depth-threshold may be increased.

In the method 300, for at least one of the one or more scan-to-risk maps, the low scan depth may be associated with a minimal scan security issues set and the full scan depth may be associated with a full scan security issues set. The minimal scan security issues set may comprise one or more security issues checked for when scanning the corresponding training asset at the low scan depth. The full scan security issues set may comprise one or more security issues checked for when scanning the corresponding training asset at the full scan depth. The minimal scan security issues set and/or the full scan security issues set may comprise security issues identifiable through the CVE identifiers.

In an aspect, the low and full scan depths may be based on the number of security issues in the low and full scan security issues sets. This implies that the number of security issues in the minimal scan security issues set may be less than the number of security issues in the full scan security issues set. The low and full scan depths may respectively reflect the number of security issues in the low and full scan security issues sets. Alternatively, the low and full scan depths may respectively reflect the number of security issues in the low and full scan security issues sets relative to the number of known security issues related to the training asset.

Recall that credentialed scanning allows local access to an asset, which should yield more accurate information. Thus, in another aspect, the low and full scan depths may be based on the number of security issues in the low and full scan security issues sets checked through credentialed scanning. This implies that the number of security issues checked through credentialed scanning in the minimal scan security issues set may be less than the number of security issues checked through credentialed scanning in the full scan security issues set. The low and full scan depths may respectively reflect the number of security issues checked through credentialed scanning in the low and full scan security issues sets. Alternatively, the low and full scan depths may respectively reflect the number of security issues in the low and full scan security issues sets checked through credentialed scanning relative to the number of known security issues related to the training asset that can be checked through credentialed scanning. Note this aspect covers instances in which no credentialed scanning is performed when scanning at the low scan depth. This simply means that there are zero security issues that are checked through credentialed scanning in the minimal scan security issues set. The minimal scan security issues set may include security issues that may be checked through uncredentialed scanning.

Another way to determine scan depth is described. Recall that a security plugin may check for one or more mitigations/fixes and flag one or more individual security issues. For example, the security plugins may check for security issues identifiable through CVE identifiers. Then the scan depth of a scan may be based on the security plugins used when scanning the training asset. For example, given an asset, there may be a number of security plugins that may be utilized to check for security issues. Then when an asset is scanned, a set of security plugins—referred to as "security plugins set" for convenience—may be utilized.

In an aspect, the scan depth may be quantified as a number of security plugins used in a scan. In this instance, the deep-scan-depth-threshold may be set as some threshold number of security plugins. Then the low scan depth may be related to relatively small security plugins set (e.g., number of security plugins utilized in the scan being less than the deep-scan-depth-threshold), while a full scan may be related to a relatively large security plugins set (e.g., number of security plugins utilized in the scan being greater than or equal to the deep-scan-depth-threshold).

Alternatively or in addition thereto, the scan depth may be quantified to reflect a number plugins used in the scan relative to a number of security plugins that can be used. For example, the scan depth of a scan may range between 0 (e.g., no security plugins used) and 1 (e.g., all security plugins used). In this instance, the deep-scan-depth-threshold may be set as some threshold ratio (e.g., 0.8). Then the low scan depth may be related to relatively small ratio (e.g., number of security plugins used in the scan relative to the number of security plugins that can be used being less than the deepscan-depth-threshold), while a full scan may be related to a relatively large ratio (e.g., number of security plugins used in the scan relative to the number of security plugins that can be used being equal to or greater than the deep-scan-depth-threshold).

Then in the method 300, for at least one of the one or more scan-to-risk maps, the low scan depth may be associated with a low scan security plugins set and the full scan depth may be associated with a full scan security plugins set. The low scan security plugins set may comprise one or more security plugins used when scanning the corresponding training asset at the low scan depth. The full scan security plugins set may comprise one or more security plugins used when scanning the corresponding training asset at the full scan depth. The low scan security plugins set and/or the full scan security plugins set may comprise security plugins that check for security issues identifiable through the CVE identifiers.

In an aspect, the low and full scan depths may be based on the number of security plugins in the low and full scan security plugins sets. This implies that a number of security plugins in the low scan security plugins set may be less than a number of security plugins in the full scan security plugins set. The low and full scan depths may respectively reflect the number of security plugins in the low and full scan security plugin sets. Alternatively, the low and full scan depths may respectively reflect the number of security plugins in the low and full scan security plugin sets relative to the number of security plugins related to the training asset.

In another aspect, the low and full scan depths may be based on the number of security plugins in the low and full scan security issues sets used in credentialed scanning (e.g., as a number or as a ratio). In this instance, a number of security plugins used in credentialed scanning in the low scan security plugins set may be less than a number of security plugins used in credentialed scanning in the full scan security plugins set. Note this aspect covers the case in which no credentialed scanning is performed when scanning at the low scan depth. This simply means that there are zero security plugins in the low scan security plugins set used credentialed scanning. The minimal scan security issues set may include security issues that may be used in uncredentialed scanning.

Figure 5:
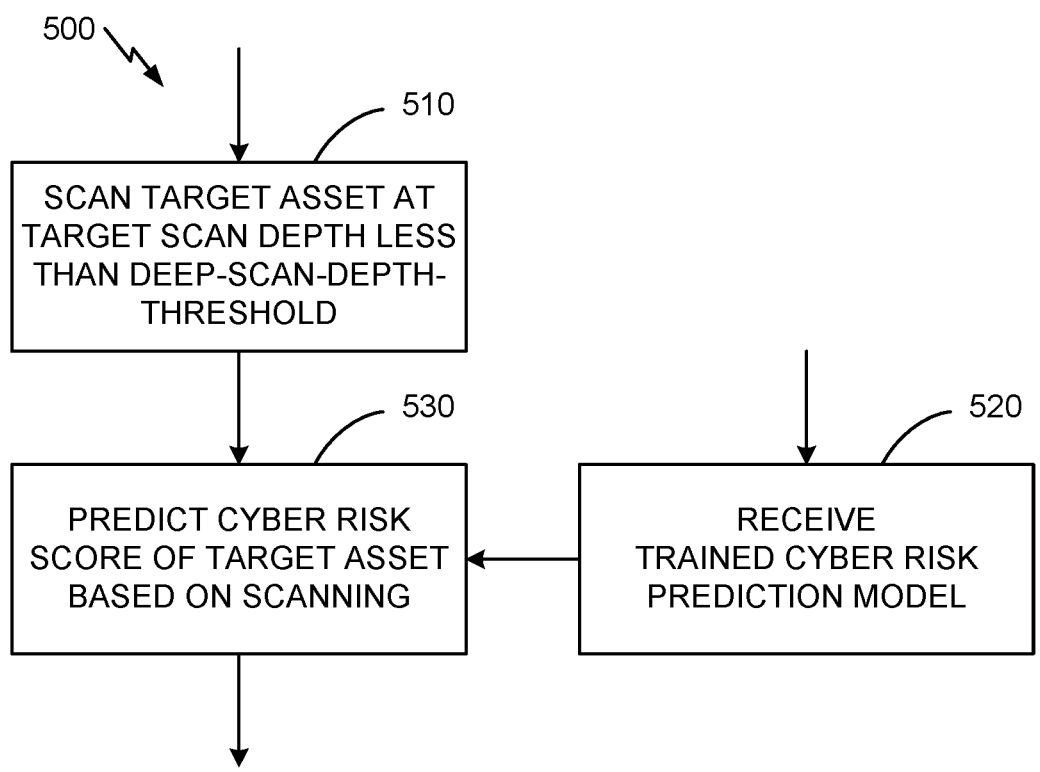
FIGS. 5 and 6 illustrate flow charts of an example method for predicting a cyber risk of a target asset, according to various aspects.

FIG. 5 illustrates a flow chart of an example method 500 for predicting a cyber risk of a target asset of a target network. The method 500 may be performed by a cyber risk predictor. In an aspect, scanners 110, 170, 210, 270 and/or the vulnerability management system 150, 250 may perform cyber risk predictor functions. In block 510, the cyber risk predictor may scan the target asset at a target scan depth less than the deep-scan-depth-threshold.

In an aspect, scanning at the target scan depth may comprise no credentialed scanning, i.e., may comprise uncredentialed scanning only. That is, the cyber risk predictor may scan the target asset without local access when scanning at the target scan depth. In another aspect, scanning at the target scan depth may comprise some credentialed scanning of the target asset, in addition to or instead of the uncredentialed scanning.

In block 520, the cyber risk predictor may receive a trained cyber risk prediction model, e.g., from a cyber risk prediction trainer. The cyber risk prediction model may be trained on a training dataset to predict cyber risks of assets. The training dataset has been described above, and thus is not repeated here.

Figure 6:
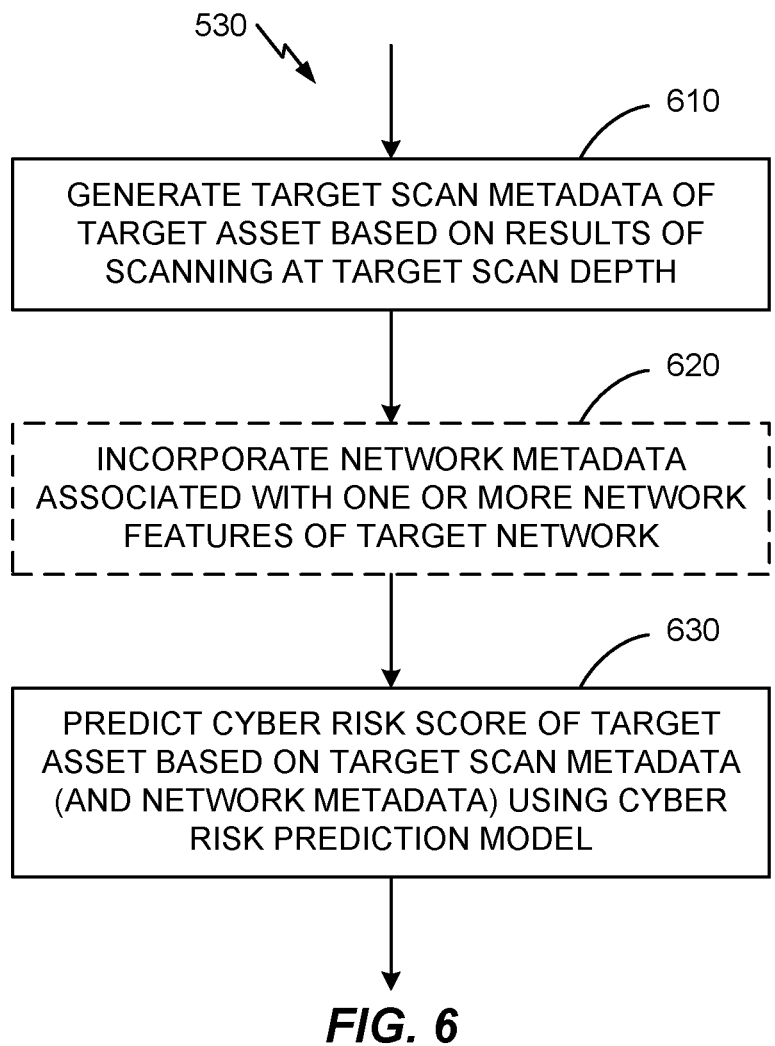

In block 530, the cyber risk predictor may cyber risk score of the target asset based on the scanning. FIG. 6 illustrates a flow chart of an exemplary process that may be performed, e.g., by the cyber risk predictor, to implement block 530. In block 610, the cyber risk predictor may generate a target scan metadata based on results of the scanning the target asset at the target scan depth. In an aspect, scanning the target asset at the target scan depth in block 610 may result in the cyber risk predictor acquiring or otherwise being provided with asset features—referred to as "target scan asset features" this time for ease of reference. In block 610, the target scan metadata of the target asset may be generated based on the target scan asset features.

The target scan asset features may comprise any combination of the asset features listed in Table 1. That is, the target scan asset features may comprise any one or more of an operating system, a device type, open common vulnerabilities and exposures (CVEs), open transport control protocol (TCP) ports, open user datagram protocol (UDP) ports, open port numbers, common platform enumeration (CPE), remediation maturity, remediation effectiveness, and scan frequency.

Optionally, in block 620, the cyber risk predictor may incorporate a target network metadata associated with one or more network features of the target network. The network features of the target network may comprise any combination of the network features listed in Table 2. That is, the network features may comprise any one or more of any one or more of an aggregate vulnerability priority rating (VPR), scan frequency score, a proportion of authenticated assets, a scan depth score, assessment maturity, and automated patch management.

In block 630, the cyber risk predictor may predict the cyber risk score of the target asset based on the target scan metadata using the cyber risk prediction model. If the target network metadata has been incorporated (i.e., if block 620 has been performed), then the cyber risk predictor may predict the cyber risk score of the target asset based on the target scan metadata and the target network metadata using the cyber risk prediction model.

In an aspect, the target scan depth may be associated with a target scan security issues set, which may comprise one or more security issues checked for when scanning the target asset at the target scan depth. The target scan security issues set may comprise security issues identifiable through the CVE identifiers.

A number of security issues in the target scan security issues set may be less than a number of security issues in a full scan security issues set of at least one scan-to-risk map of the training dataset. Alternatively, a number of security issues in the target scan security issues set checked through credentialed scanning of the target asset may be less than a number of security issues in the full scan security issues set of at least one scan-to-risk map of the training dataset checked through credentialed scanning of the corresponding training asset.

In another aspect, the target scan depth may be associated with a target scan security plugins set, which may comprise one or more security plugins utilized when scanning the target asset at the target scan depth. The target scan security plugins set may comprise security plugins that check for security issues identifiable through the CVE identifiers.

A number of security plugins in the target scan security plugins set may be less than a number of security plugins in a full scan security plugins set of at least one scan-to-risk map of the training dataset. Alternatively, a number of security plugins in the target scan security plugins set utilized in credentialed scanning of the target asset may be less than a number of security plugins in the full scan security plugins set of at least one scan-to-risk map of the training dataset used in credentialed scanning of the corresponding training asset.

Figure 7:
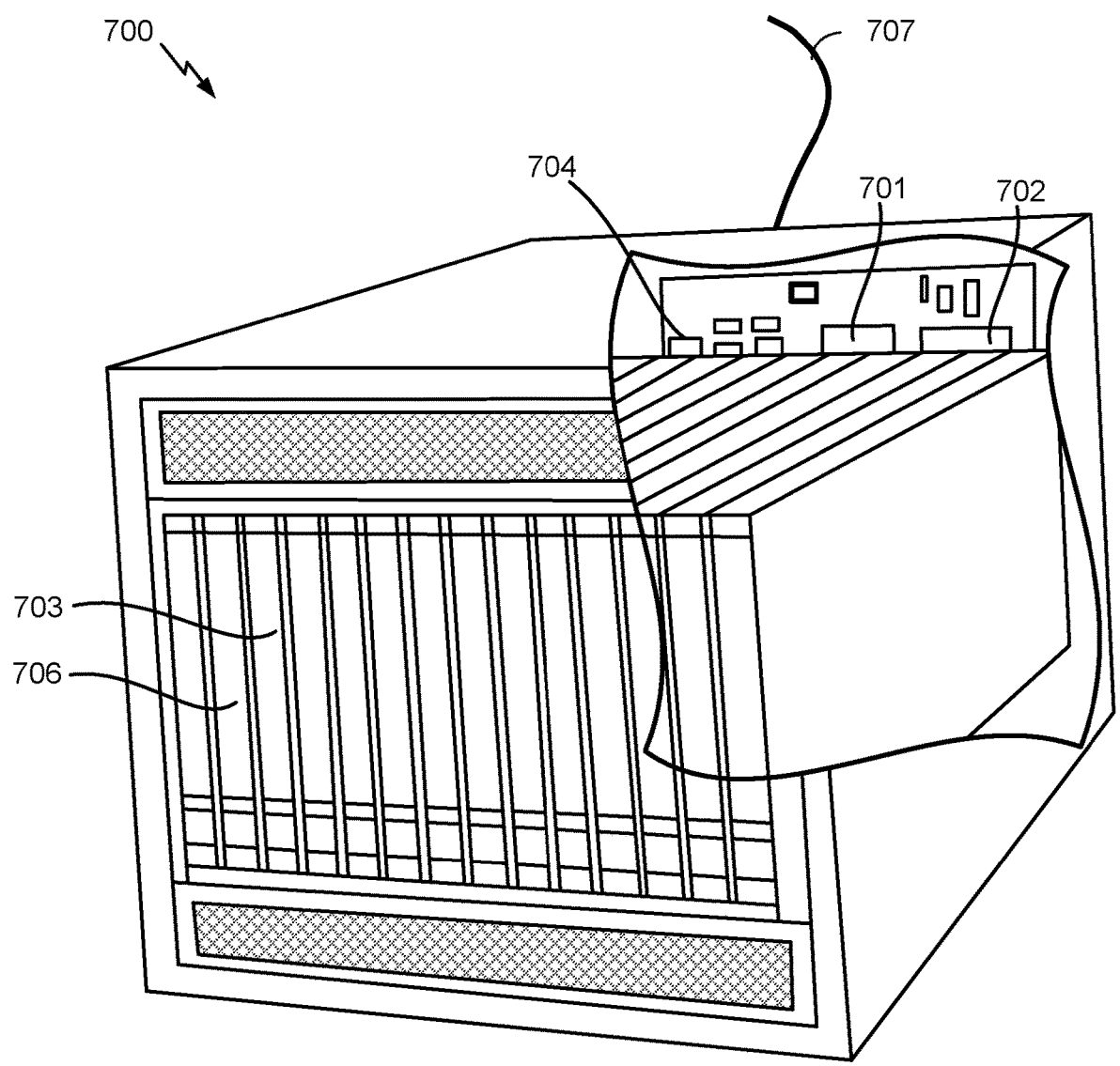
FIG. 7 illustrates an apparatus, according to various aspects.

The various embodiments may be implemented on any of a variety of commercially available computing devices, such as an apparatus 700 illustrated in FIG. 7. In an example, the apparatus 700 may correspond to one example configuration of a computing device on applications that train cyber risk prediction model, e.g., as part of a cyber risk prediction trainer configured to perform the method 300 illustrated in FIGS. 3 and 4. In another example, the apparatus 700 may correspond to one example configuration of a computing device on applications that predict cyber risk scores of target assets, e.g., as part of a cyber risk predictor configured to perform the method 500 illustrated in FIGS. 5 and 6.

In FIG. 7, the apparatus 700 may include one or more processors 701 coupled to volatile memory 702 and a large capacity nonvolatile memory, such as a disk drive 703. The apparatus 700 may also include a floppy disc drive, flash/solid state media drive, compact disc (CD) or DVD disc drive 706 coupled to the one or more processors 701. The apparatus 700 may also include network access ports 704 coupled to the one or more processors 701 for establishing data connections with a network 707, such as a local area network coupled to other broadcast system computers and servers or to the Internet. The network access ports 704 may be more broadly described as communicators 704.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, flash/solid state media, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of training a cyber risk predictor, the method comprising:

obtaining a training dataset comprising one or more scan-to-risk maps corresponding to one or more training assets;

training a cyber risk prediction model based on the training dataset; and providing the trained cyber risk prediction model to a cyber risk predictor, wherein at least one scan-to-risk map of the training dataset comprises a low scan metadata and a cyber risk score mapped to the low scan metadata, the low scan metadata being associated with results of scanning the corresponding training asset at a low scan depth less than a deep-scan-depth-threshold, and the cyber risk score being associated with results of scanning the corresponding training asset at a deep scan depth equal to or greater than the deep-scan-depth-threshold, and wherein the cyber risk prediction model enables the cyber risk predictor to predict a cyber risk score of a target asset of a network based on results of scanning the target asset at a target scan depth less than the deep-scan-depth-threshold.

2. The method of claim 1, wherein the one or more scan-to-risk maps include at least first and second scan-to-risk maps both corresponding to a same training asset, the first scan-to-risk map comprising a first low scan metadata and a first cyber risk score, and the second scan-to-risk map comprising a second low scan metadata and a second cyber risk score, the first and second low scan metadata being different, and the first and second cyber risks being the same.

3. The method of claim 1, wherein obtaining the training dataset comprises:

for each of the at least one scan-to-risk map, scanning the corresponding training asset at the low scan depth;

generating the low scan metadata of that scan-to-risk map based on results of the scanning at the low scan depth; and mapping the low scan metadata to the cyber risk score of the corresponding training asset.

4. The method of claim 3, wherein the one or more scan-to-risk maps include at least first and second scan-to-risk maps such that the low scan depth of the first scan-to-risk map is different from the low scan depth of the second scan-to-risk map.

5. The method of claim 3, wherein the scanning at the low scan depth comprises no credentialed scanning.

6. The method of claim 3, wherein obtaining the training dataset further comprises:

for at least one of the one or more scan-to-risk maps, scanning the corresponding training asset at the deep scan depth; and determining, prior to mapping, the cyber risk score of the corresponding training asset based on results of the scanning at the deep scan depth.

7. The method of claim 6, wherein the scanning at the deep scan depth comprises credentialed scanning.

8. The method of claim 3, wherein for the at least one of the one or more scan-to-risk maps, the results of scanning the corresponding training asset at the low scan depth include low scan asset features, the low scan metadata of that scan-to-risk map being generated based on the low scan asset features.

9. The method of claim 8, wherein the low scan asset features comprise any one or more of an operating system, a device type, open common vulnerabilities and exposures (CVEs), open transport control protocol (TCP) ports, open user datagram protocol (UDP) ports, open port numbers, common platform enumeration (CPE), remediation maturity, remediation effectiveness, and scan frequency.

10. The method of claim 1, wherein obtaining the training dataset further comprises:

for at least one of the one or more scan-to-risk maps, incorporating a network metadata associated with one or more network features to the training dataset such that the at least one scan-to-risk map further comprises the network metadata, and wherein in mapping, a combination of the low scan metadata and the network metadata of the at least one scan-to-risk map is mapped to the cyber risk score of the corresponding training set.

11. The method of claim 10, wherein the network features comprise any one or more of an aggregate vulnerability priority rating (VPR), scan frequency score, a proportion of authenticated assets, a scan depth score, assessment maturity, and automated patch management.

12. The method of claim 1, wherein for at least one of the one or more scan-to-risk maps, the low scan depth is associated with a minimal scan security issues set comprising one or more security issues checked for when scanning the corresponding training asset at the low scan depth, and the deep scan depth is associated with a deep scan security issues set comprising one or more security issues checked for when scanning the corresponding training asset at the deep scan depth.

13. The method of claim 12, wherein the minimal scan security issues set includes one or more security issues identifiable through common vulnerabilities and exposures (CVE) identifiers, and/or the deep scan security issues set includes one or more security issues identifiable through the CVE identifiers.

14. The method of claim 12, wherein a number of security issues in the minimal scan security issues set is less than a number of security issues in the deep scan security issues set.

15. The method of claim 12, wherein a number of security issues checked through credentialed scanning in the minimal scan security issues set is less than a number of security issues checked through credentialed scanning in the deep scan security issues set.

16. The method of claim 1, wherein for at least one of the one or more scan-to-risk maps, the low scan depth is associated with a low scan security plugins set comprising one or more security plugins utilized when scanning the corresponding training asset at the low scan depth, and the deep scan depth is associated with a deep scan security plugins set comprising one or more security plugins utilized when scanning the corresponding training asset at the deep scan depth.

17. The method of claim 16, wherein the low scan security plugins set includes one or more security plugins that check for security issues identifiable through common vulnerabilities and exposures (CVE) identifiers, and/or the deep scan security plugins set includes one or more security plugins that check for security issues identifiable through the CVE identifiers.

18. The method of claim 16, wherein a number of security plugins in the low scan security plugins set is less than a number of security plugins in the deep scan security plugins set.

19. The method of claim 16, wherein a number of security plugins used in credentialed scanning in the low scan security plugins set is less than a number of security plugins used in credentialed scanning in the deep scan security plugins set.

20. A method to predict a cyber risk of a target asset of a target network, the method comprising:

scanning the target asset at a target scan depth less than a deep-scan-depth-threshold; and predicting, by a cyber risk predictor, a cyber risk score of the target asset based on the scanning, wherein the cyber risk predictor comprises a cyber risk prediction model trained on a training dataset to predict cyber risks of assets, the training dataset comprising one or more scan-to-risk maps corresponding to one or more training assets, at least one scan-to-risk map of the training dataset comprising a low scan metadata and a cyber risk score mapped to the low scan metadata, the low scan metadata being associated with results of scanning the corresponding training asset at a low scan depth less than a deep-scan-depth-threshold, and the cyber risk score being associated with results of scanning the corresponding training asset at a deep scan depth equal to or greater than the deep-scan-depth-threshold.

21. The method of claim 20, wherein the scanning at the target scan depth comprises no credentialed scanning.

22. The method of claim 20, wherein predicting the cyber risk score comprises:

generating a target scan metadata of the target asset based on the results of the scanning at the target scan depth; and predicting the cyber risk score of the target asset based on the target scan metadata using the cyber risk prediction model.

23. The method of claim 22, wherein the results of scanning the target asset at the target scan depth include target scan asset features, the target scan metadata of the target asset being generated based on the target scan asset features.

24. The method of claim 23, wherein the target scan asset features include any one or more of operating system, device type, open common vulnerabilities and exposures (CVEs), open transport control protocol (TCP) ports, open user datagram protocol (UDP) ports, open port numbers, common platform enumeration (CPE), remediation maturity, remediation effectiveness, and scan frequency.

25. The method of claim 22, further comprising:

incorporating a target network metadata associated with one or more network features of the target network, wherein in predicting the cyber risk score of the target asset, the cyber risk score is predicted based on the target network metadata in addition to the target scan metadata using the cyber risk prediction model.

26. The method of claim 25, wherein the network features include any one or more of any one or more of the following of the target network:

an aggregate vulnerability priority rating (VPR), scan frequency score, a proportion of authenticated assets, a scan depth score, assessment maturity, and automated patch management.

27. The method of claim 20, wherein the target scan depth is associated with a target scan security issues set comprising one or more security issues checked for when scanning the target asset at the target scan depth.

28. The method of claim 27, wherein the target scan security issues set includes one or more security issues identifiable through common vulnerabilities and exposures (CVE) identifiers.

29. The method of claim 20, wherein the target scan depth is associated with a target scan security plugins set comprising one or more security plugins utilized when scanning the target asset at the target scan depth.

30. The method of claim 29, wherein the target scan security plugins set includes one or more security plugins that check for security issues identifiable through common vulnerabilities and exposures (CVE) identifiers.

31. A cyber risk prediction trainer, comprising:

a memory; and at least one processor coupled to the memory, wherein the memory and the at least one processor are configured to:

obtain a training dataset comprising one or more scan-to-risk maps corresponding to one or more training assets;

train a cyber risk prediction model based on the training dataset; and provide the trained cyber risk prediction model to a cyber risk predictor, wherein at least one scan-to-risk map of the training dataset comprises a low scan metadata and a cyber risk score mapped to the low scan metadata, the low scan metadata being associated with results of scanning the corresponding training asset at a low scan depth less than a deep-scan-depth-threshold, and the cyber risk score being associated with results of scanning the corresponding training asset at a deep scan depth equal to or greater than the deep-scan-depth-threshold, and wherein the cyber risk prediction model enables the cyber risk predictor to predict a cyber risk score of a target asset of a network based on results of scanning the target asset at a target scan depth less than the deep-scan-depth-threshold.

32. A cyber risk predictor, comprising:

a memory; and at least one processor coupled to the memory, wherein the memory and the at least one processor are configured to:

scan a target asset of a target network at a target scan depth less than a deep-scan-depth-threshold; and predict a cyber risk score of the target asset based on the scanning, wherein the cyber risk predictor comprises a cyber risk prediction model trained on a training dataset to predict cyber risks of assets, the training dataset comprising one or more scan-to-risk maps corresponding to one or more training assets, at least one scan-to-risk map of the training dataset comprising a low scan metadata and a cyber risk score mapped to the low scan metadata, the low scan metadata being associated with results of scanning the corresponding training asset at a low scan depth less than a deep-scan-depth-threshold, and the cyber risk score being associated with results of scanning the corresponding training asset at a full scan depth equal to or greater than the deep-scan-depth-threshold.

* * * * *